April 2, 1957
R. T. CORNELIUS
2,787,143
UNIVERSAL JOINTS
Filed June 28, 1955
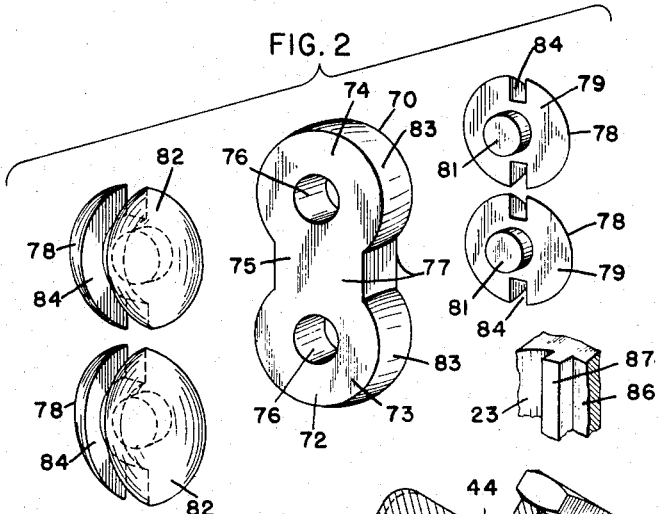
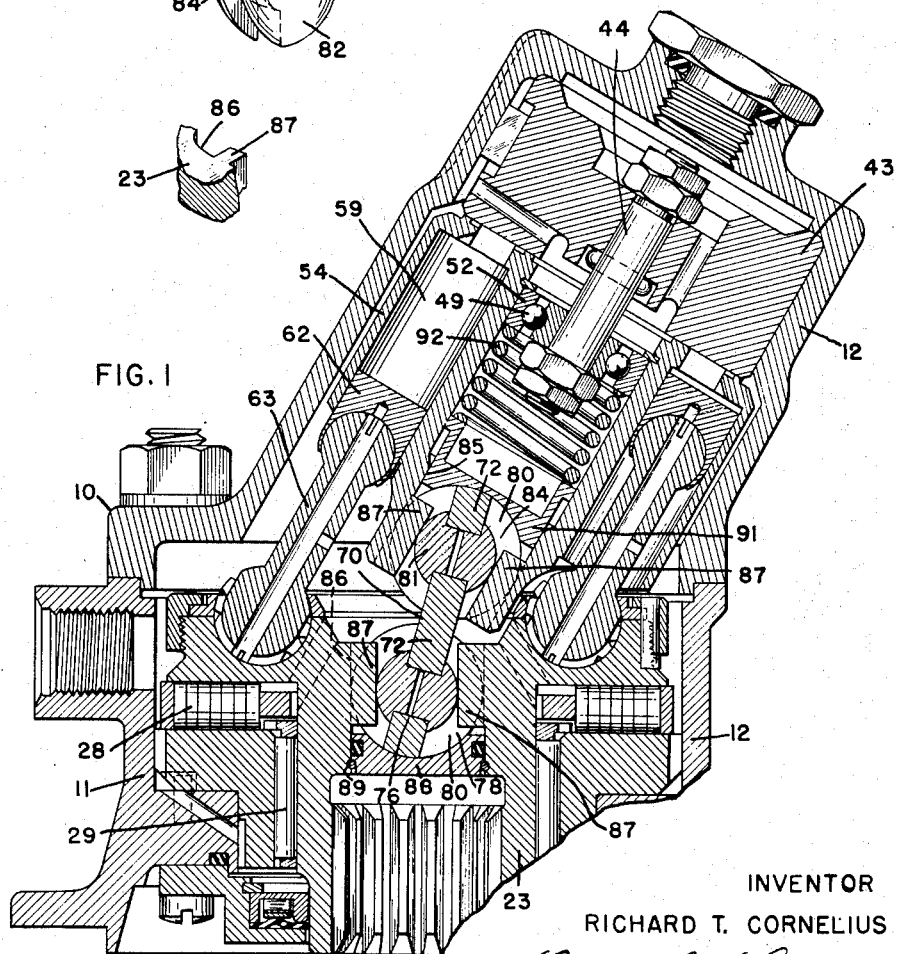
INVENTOR
RICHARD T. CORNELIUS
Caswell + Lagaard
ATTORNEYS 2,787,143
Patented Apr. 2, 1957

2,787,143

UNIVERSAL JOINTS

Richard T. Cornelius, Minneapolis, Minn.

Application June 28, 1955, Serial No. 518,447

8 Claims. (Cl. 64—6)

The herein disclosed invention relates to universal joints and particularly to the type of joint in which the transmitted motion corresponds with the transmitting motion.

An object of the invention resides in providing a universal joint which is extremely small in dimensions and which can handle a relatively great amount of power.

Another object of the invention resides in providing a universal joint which can be readily fabricated and in which wear is resisted in a most effective manner.

Another object of the invention resides in constructing the universal joint with a plate-like body having spaced heads at the ends of the same, said heads being formed with bearings transverse to the plane of the body, and in further providing caps formed with short trunnions received within said bearings and journaling said cap for rotation with respect to said heads.

An object of the invention resides in constructing the driving and driven members with bores having splines extending into the same and in forming said heads and caps with continuous spherical surfaces adapted to fit within said bores and said caps with planiform arcuate grooves adapted to receive the splines.

A feature of the invention resides in arranging said grooves so that the medial planes thereof contain the axes of said bearings.

Other objects of the invention reside in the novel combination and arrangement of parts and in the details of construction hereinafter illustrated and/or described.

In the drawings:

Fig. 1 is a vertical sectional view of a pump illustrating an embodiment of the invention applied thereto.

Fig. 2 is a perspective view of the parts of the universal joint removed from the pump and spaced from one another.

For the purpose of illustrating the invention, a pump 10 has been shown which includes a base 11 and on which a case 12 is mounted. Mounted within the base 11 are bearings 28 and 29 which rotatably support a rotor 23. Mounted in the case 12 is a valve head 43 having a spindle 44 extending outwardly therefrom. This spindle has mounted on it a ball bearing 49 which rotatably supports a revoluble cylinder block 54. Pistons 62 sliding in cylinder bores 59 in said cylinder blocks are connected by means of connecting rods 63 to the rotor 23. Acting between the cylinder block 54 and the rotor 23 is a universal joint 70 which forms the subject matter of the instant invention. The rotor 23 is driven by any suitable external power and constitutes the driving member of the pump. The cylinder block 54 is driven from the rotor 23 through the universal joint 70 and constitutes the driven member of the pump. It will, however, be readily comprehended that the fluid under pressure may be supplied to the pump to form a motor out of the same and in which the driving and driven elements would be reversed.

The universal joint 70 is shown in detail in Fig. 2. This joint includes a body 72 constructed of flat bar stock which is formed with oppositely disposed parallel faces 77. The body 72 is further formed to provide spaced heads 73 and 74 with a neck 75 extending therebetween. The heads 73 and 74 have transverse bores 76 extending through the same and which are at right angles to the medial plane of the body 72 and which form bearings. In conjunction with the body 72 four caps 78 are employed which are identical in construction. These caps have faces 79 adapted to overlie the faces 77 of the body 72. Issuing from these faces are short stub shafts 81 which are adapted to be received in the bearing 76 and which form journals and guide said caps for rotation relative to said bores. The journals 81 are of a length equal substantially to half the thickness of the body 72 or less, so that the caps on opposite sides of the body may be rotatably mounted for concentric rotation with respect to the body proper. The outer surfaces 82 of the cap 78 and the corresponding surfaces 83 of the heads 73 and 74 are spherical in form so that the assembled structure forms balls, indicated by the reference numeral 80 in Fig. 1, at the ends of the body 72. The caps 78 are formed with planiform arcuate grooves 84 whose medial planes contain the axes of the respective journals 81.

In the cylinder block 54 is formed a bore 85 and in the rotor 23 is a similar bore 86. These bores are of a diameter to snugly receive the balls 80. Extending inwardly from these bores are splines 87 which are received in the grooves 84 of the caps 78. When the universal joint 70 is mounted in these bores, the parts are held assembled through the caps 78 engaging the walls of said bores so that the journals 81 are maintained within the bearings 76. The ball 80 within the bore 86 is held from endwise movement by means of a seat 88 disposed within said bore and secured in place therein by means of a snap ring 89. The ball 80 in bore 85 is similarly held in place by means of a seat 91 which is slidably mounted in said bore and which is urged against the ball 83 by means of a compression coil spring 92 seated at one end against said seat and at the other end against the outer race 52 of ball bearing 49. By means of the construction shown, the torsional stress procured by rotating rotor 23 is transmitted to cylinder block 54 through the universal joint 70 so that no twisting of the connecting rods 63 occurs.

Due to the fact that two heads are used with the universal joint, the motion of the driven member 54 corresponds to the motion of the driving member 23. In this manner, rotation of rotor 23 will drive the rotor 54 and cause the pistons 62 to slide in the bores 59 and pump the fluid in the conventional manner.

The advantages of the invention are manifest. The universal joint is of extremely small diameter and is relatively short. Despite its small size, considerable power can be transmitted through the joint and with a minimum amount of friction. The joint can be easily constructed at a nominal expense and a duplication of corresponding parts simplifies the construction and assembly and reduces the cost.

Changes in the specific form of the invention, as herein described, may be made within the scope of what is claimed without departing from the spirit of the invention.

Having described the invention, what is claimed as new and desired to be protected by Letters Patent is:

1. In a universal joint, a tubular driving member having a bore, oppositely facing splines extending longitudinally along said bore and projecting inwardly therefrom, a driven member having a bore, oppositely facing splines extending longitudinally along said second named bore and projecting inwardly therefrom, a plate-like body having spaced heads with a stem therebetween, said heads having bearings therein transverse to the medial plane of said body, caps overlying said heads on opposite sides thereof, journals on said caps journaled in said bearings, said heads and caps having spherical surfaces lying in continuation of one another to form balls at the ends of said stem received within said bores, the centers of said surfaces lying at the intersections of the axes of said journals and the medial plane of said connector, said caps having circumferential grooves therein, the medial planes of which contain the axes of said journals, said grooves slidably receiving said splines.

2. In a universal joint, a tubular driving member having a bore, oppositely facing splines extending longitudinally along said bore and projecting inwardly therefrom, a driven member having a bore, oppositely facing splines extending longitudinally along said second named bore and projecting inwardly therefrom, a plate-like body having spaced heads with a stem therebetween, said heads having bearings therein transverse to the medial plane of said body, caps overlying said heads on opposite sides thereof, journals on said caps journaled in said bearings, said heads and caps having spherical surfaces lying in continuation of one another to form balls at the ends of said stem received within said bores, the centers of said surfaces lying at the intersections of the axes of said journals and the medial plane of said connector, said caps having circumferential grooves therein the medial planes of which contain the axes of said journals, said grooves slidably receiving said splines, and means within the bores of said driving and driven members forming seats engaging said balls.

3. In a universal joint, a driving member and a driven member, one thereof having a socket therein, a spline disposed within said socket and projecting inwardly therefrom, a body having a stem and a head at one end thereof, said head being formed with a face, a cap overlying said face, journal means acting between said cap and head and supporting said cap for rotation relative to said head, said cap and head having spherical surfaces lying in continuation of one another and forming a ball received within said socket, said cap having a planiform groove therein whose medial plane contains the axis of said journal means and receiving said spline, and driving means connected to said stem and to the other member.

4. In a universal joint, a driving member and a driven member, one thereof having a socket therein, a spline disposed within said socket and projecting inwardly therefrom, a body having a stem and a head at one end thereof, said head being formed with a face, a cap overlying said face, journal means acting between said cap and head and supporting said cap for rotation relative to said head, said cap and head having spherical surfaces lying in continuation of one another and forming a ball received within said socket, said cap having a planiform arcuate groove therein whose medial plane contains the axis of said journal means and receiving said spline and whose center coincides with the center of said ball.

5. In a universal joint, a driving member and a driven member, one thereof having a socket therein, a spline disposed within said socket and projecting inwardly therefrom, a plate-like body having a stem and a head at one end thereof, said head being formed with oppositely disposed faces, caps overlying said faces and disposed on opposite sides of said head, journal means acting between said caps and head and supporting said caps for rotation relative to said head, said caps and head having spherical surfaces lying in continuation of one another and forming a ball received in said socket, one of said caps having a planiform groove therein receiving said spline, and driving means connected to said stem and to the other member.

6. In a universal joint, a driving member and a driven member, one thereof having a socket therein, a spline disposed within said socket and projecting inwardly therefrom, a body having a stem and a head at one end thereof, said head being formed with a face, a cap overlying said face, said head having a bearing therein whose axis lies at right angles to said face, a journal issuing from said cap and received in said bearing and supporting said cap for rotation relative to said head, said cap and head having spherical surfaces lying in continuation of one another and forming a ball received within said socket, said cap having a planiform groove therein whose medial plane contains the axis of said bearing and journal and receiving said spline.

7. In a universal joint, a driving member and a driven member, one thereof having a socket therein, a spline disposed within said socket and projecting inwardly therefrom, a body having a stem and a head at one end thereof, said head being formed with a face, a cap overlying said face, said head having a bearing therein whose axis lies at right angles to said face, a stub shaft integral with said cap and extending outwardly therefrom and received with said bearing and supporting said cap for rotation relative to said head, said cap and head having spherical surfaces lying in continuation of one another and forming a ball received within said socket, said cap having a planiform groove therein whose medial plane contains the axis of said bearing and journal and receiving said spline.

8. In a universal joint, a driving member and a driven member, one thereof having a socket therein, a spline disposed within said socket and projecting inwardly therefrom, a plate-like body having a stem and a head at one end thereof, said head being formed with oppositely disposed faces, caps overlying said faces and disposed on opposite sides of said head, said head having a bore therethrough whose axis lies at right angles to said faces and forming a bearing, stub shafts integral with said caps and extending into said bearing, one of said shafts occupying one end of said bearing and the other shaft the other end of said bearing and supporting said caps for rotation relative to said head, said caps and head having spherical surfaces lying in continuation of one another and forming a ball received in said socket, one of said caps having a planiform groove therein receiving said spline, and driving means connected to said stem and to the other member.

References Cited in the file of this patent

UNITED STATES PATENTS

| 1,527,958 | Roberts | Feb. 24, 1925 |
| 2,118,028 | Biggert | May 24, 1938 |